United States Patent Office 3,214,335
Patented Oct. 26, 1965

3,214,335
LONG LASTING BENZENE SULFONAMIDE DERIVATIVES
Paul Diedrich, deceased, late of Falkensee-Finkenkrug, near Berlin, Germany, by Hildegard Diedrich, sole heir, Walsrode, Hannover, Germany, assignor to Schering AG, Berlin, Germany
No Drawing. Original application June 30, 1960, Ser. No. 39,770, now Patent No. 3,203,951, dated Aug. 31, 1965. Divided and this application Apr. 24, 1963, Ser. No. 275,462
Claims priority, application Germany, July 8, 1959, Sch 26,329
16 Claims. (Cl. 167—51.5)

This application is a division and a continuation-in-part of copending application Serial No. 39,770, filed June 30, 1960.

This invention relates to drugs having a protracted effect and composed of benzene sulfonamide derivatives and more particularly to sulfanilamido pyrimidines and their salts or derivatives wherein the 5-position of the pyrimidine ring is substituted by an alkoxy radical.

In accordance with the invention, long-lasting efficacious benzene sulfonamides are produced by conversion of reactive acid derivatives of benzene sulfonic, sulfenic, or sulfinic acids, containing amino groups or groups convertible into amino groups in the p-position, to 2-(p-aminobenzene-sulfonamido)-5-alkoxy pyrimidine compounds. Such substituted benzene sulfonamides may be produced by reacting the said derivatives of benzene sulfonic, sulfenic, or sulfinic acids with 2-halogen or 2-amino-5-alkoxy pyrimidine or a suitable derivative and if necessary by subsequent oxidation to the sulfonic acid and liberation of the amino group in the benzene ring to form benzene sulfonamide pyrimidines which are distinguished from the known sulfanilamido pyrimidines by substitution of an alkoxy group in the 5-position of the pyrimidine ring, e.g., as follows:

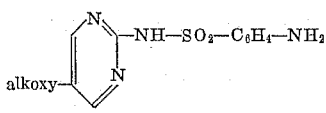

In general, there are preferably no more than 4 carbon atoms in the alkoxy group, and even more preferably, the alkoxy group is either methoxy or ethoxy.

In accordance with the method of producing the 5-alkoxy substituted pyrimidine ring compounds or their salts, the substituted benzene sulfonic, sulfenic or sulfinic acids in the form of their halogen or anhydride derivatives are reacted with 2-amino-5-alkoxy pyrimidines to form the corresponding 2-amino benzene sulfonic, sulfenic or sulfinic-5-alkoxy pyrimidine derivative. The 5-alkoxy pyrimidine derivative may also be prepared by reacting the substituted benzene sulfon, sulfin, or sulfen amides with 2-halogen-5-alkoxy pyrimidines. The 5-alkoxy pyrimidine derivative may further be prepared by converting the benzene sulfonamides in the form of their salts, where the amide is present as an anion, by reacting the same with 2-trimethyl ammonium-5-alkoxy pyrimidine. Still another method consists in converting the benzene sulfonic acid derivatives in the form of their sulfonyl guanidines by reaction of the same with beta-dicarbonyl compounds containing a CO—CHXCO enolizable group, and where X is an alkoxy group. These beta-dicarbonyl compounds are for example, alkoxylized derivatives of malonic dialdehyde and methoxymalonic acid diethylester. After conversion in these cases, the hydroxy groups in the 4 and/or 6 position, if present, are replaced with hydrogen. Where the basic compound used is a sulfenic or sulfinic acid derivative, the sulfonic group is produced by oxidation and where the group substituted in the nucleus is a group convertible to an amino group, the amino group is liberated.

The 2-sulfanilamido-5-alkoxy pyrimidines produced in this manner function the same as the known group of highly efficacious sulfonamides of the pyrimidine series, but of most impartance the new drugs of this invention have been demonstrated in the treatment of human beings to be longer lasting at the same strengths. The same excellent properties with respect to the range of application as well as the level of activity of these 5-alkoxy substituted sulfanilamido pyrimidines was observed in a number of comparative tests with both sulfadiazine (2-(p-aminobenzenesulfonamido) - pyrimidine), the active constituent of many well known medicinal products, and sulfanilamido-ethyl-thiadiazol which likewise has proved to be of therapeutic utility. The tests were carried out as in-vitro experiments employing the plate thinning test with busamager (2% meat hydrolyzate "Busam," 1% dextrose, 0.5% horse blood). The sulfamide concentrations in the plates were in parts 1:10,000; 1:30,000; 1:100,000; 1:300,000; and 1:1,000,000. After applying the germs as ten vaccination strips onto each thinning plate, it was observed that distinct to complete inhibition of the growth of bacterial was obtained at 1:30,000 and 1:1,000,000 parts concentration. In the case of some particular bacteria (e.g., *Br. abortus* Bang, *E. coli*, *Str. pyogenes*) the bacterial growth was inhibited even at a concentration of 1:300,000.

The toxicity observed to be in the same order of magnitude as toxicities of sulfonamides with correspondingly high activity, is compared as follows:

TABLE I

| Compound: | Minimum lethal dose in gr./kg. rat i.v. $LD_{50}$ |
|---|---|
| 2-sulfanilamido-5-methoxy-pyrimidine | 1.1 |
| 2-sulfanilamido-pyrimidine (sulfadiazine) | 0.9 |
| 3-sulfanilamido-6-methoxy pyridazine | 1.1 |
| 3-sulfanilamido-2-phenyl-pyrazole | 0.7 |

In blood tests with human beings, it was observed that by using the 5-alkoxy substituted pyrimidines of this invention, every case resulted in producing a surprisingly long-lasting high level of concentration of the sulfa drug in the blood. For example, when perorally administering 1 gram of the sodium salt of 2-sulfanilamido-5-methoxy pyrimidine to a human, the concentration of the methoxy pyrimidine in the blood after 4 to 8 hours was found to average between 4 and 5 mg. per 100 cc. of blood. Where intravenous application of the alkoxy substituted pyrimidine is employed, the blood has been found to contain more than 4 mg. per 100 cc. after one hour, and even after 24 hours, the blood was found to still contain above 3 mg. per 100 cc. in all cases tested, and in some humans tested the concentration of the alkoxy substituted pyrimidine drum was as much as 4 mg. per 100 cc. of blood.

By contrast, in comparative blood tests made using sulfadiazine, a closely chemically related sulfonamide, it was found that to obtain equally high concentrations of the sulfa drug in the blood (e.g., over 4 mg./100 cc.) there is required a peroral administration of 3 doses of 1 gram each, or in other words, three times as much as the 5-alkoxy substituted pyrimidine of the present invention. Furthermore, tests showed that even after the peroral administration of 3 grams of sulfadiazine, the concentration of the sulfa drug in the blood decreased so rapidly, that at the end of 20 hours there is found only 2 mg. per 100 cc. of blood.

Correspondingly, it has also been found that these 5-alkoxy substituted pyrimidines, for example 2-sulfanilamido-5-methoxy pyrimidine, are excreted relatively slowly in the urine. An average of less than 30% of the input of the alkoxy substituted pyrimidine was released to the urine after 24 hours, both where the sulfa pyrimidine drug was administered orally and in the case of intravenous injection of 1 gram of the drug. Furthermore, only a small percentage of the sulfa drug was acetylized.

A great deal of interest has been shown recently concerning these sulfonamides, and in particular, attempts have been made to decrease the frequency of administration of these sulfa drugs because a high frequency is currently required to maintain an effective concentration in the blood. As a matter of fact, various substitutions of sulfanilamido pyrimidines have been described, such as set out in The Journal of American Chemical Society, 1947, vol. 69, II, pages 3072–3078. In this connection, however, it was found, as shown by the prior art and confirmed by recent tests, that the introduction of an alkoxy group in the 4- or 6-position of the pyrimidine ring was accompanied by such a marked decrease in the bacteriostatic effect of the sulfa pyrimidine compound that it made the same medically useless for all practical purposes.

It was, therefore, absolutely and completely unexpected that the introduction of an alkoxy group in the 5-position of the pyrimidine ring of the sulfa pyrimidine drug compounds would produce such a marked improvement in the therapeutic properties of these drugs. Instead of there being a diminution of the bacteriostatic activity of these drugs, as could be expected, there is obtained an opposite result—their therapeutic activity in human beings is protracted.

The following examples are presented to illustrate methods of preparing the compounds, but said examples are not to be considered limitative of the specification and appended claims.

*Example 1*

Preparation of 2 - (p - aminobenzenesulfonamido) - 5-methoxy pyrimidine (melting point 211–212° C.).

To prepare this compound, 12.6 grams of 2-amino-5-methoxy pyrimidine, 26.4 grams of carbethoxy-sulfanilic acid chloride and 50 cc. of dry pyridine are heated for 30 minutes with frequent shaking to a temperature of 80° C. The reaction product is then mixed with 200 cc. of water and with dilute hydrochloric acid (0.1 N) until the reaction is acid to Congo Red indicator. A precipitate is formed which is then filtered under suction, washed with distilled water, and dried at 150° C. A practically quantitative yield is recovered of 2-(p-carbethoxy-aminobenzene-sulfonamido)-5-methoxy-pyrimidine, M.P. 248–250° C.

To hydrolyze the sulfa pyrimidine compound, the same is heated at 90° C. with 200 cc. of 2 N potassium hydroxide solution for about one hour until complete solution is obtained. The resultant solution is then cooled to room temperature (25° C.) and acidified with acetic acid to precipitate the hydrolyzed product, which is then recrystallized from dilute acetone admixed with animal charcoal.

In the foregoing example, the 2-amino-5-methoxy pyrimidine compound is obtained having a melting point of about 300° C. by condensation of methoxy-malonic-acid ester with guanidine carbonate in the presence of sodium ethylate. The resultant reaction product is then converted to 2 - amino - 5 - methoxy - 4,6 dichloropyrimidine (melting point 216–217° C.) by heating said reaction product with phosphorus oxychloride. The dichloro compound is then suspended in water with zinc dust and is tested in the presence of caustic alkaline or carbonates to produce the 2-amino-5-methoxy pyrimidine compound, M.P. 80–82° C., benzene).

*Example 2*

In this instance the method was carried out as in Example 1, by reacting 13.9 grams of 2-amino-5-ethoxy pyrimidine having a melting point of 113–115° C. (intermediate products: ethoxy-malonyl-guanidine, M.P. above 300° C., 5-ethoxy-2-amino-4,6-dichloropyrimidine, M.P. 188–189° C.) with 26.4 grams of carbethoxy-sulfanilic acid chloride and 50 cc. dry pyridine to produce the corresponding 2 - (p - carbethoxy - amino - benzene - sulfonamido)-5-ethoxy pyrimidine compound having a melting point of 240–241° C.

Hydrolysis of this latter compound in the same manner as described in Example 1 yields the 2-(p-aminobenzenesulfonamido)-5-ethoxy-pyrimidine which may be purified by recrystallization from acetone in the presence of animal charcoal. Colorless crystals of the product are obtained having a melting point of 204–206° C.

Where other 5-alkoxy substituted pyrimidine sulfanyl amino compounds are desired, the same can be produced by employing the appropriate reactants and carrying out the process as described.

With respect to the various pharmaceutical compositions that can be produced on the basis of the novel benzene sulfonamide derivatives in this invention, it is to be noted that the concentration of the active compound in unit dosage form is in the same general range as conventional benzene sulfonamide derivatives. Preferably, however, the derivatives of this invention are employed in a unit dosage of about 250 mg. to 1000 mg., still more preferably 250 to 500 mg. These dosages are particularly applicable to a one-a-day administration of the drugs to human beings. As possible carriers and excipients for the active ingredients, again it is possible to borrow from the previous technology regarding the formulation of pharmaceutical compositions incorporating conventional sulfa drugs. As preferred embodiments of pharmaceutical compositions of this invention, the following examples are presented but these examples are not intended to be limitative of the specification or the appended claims whatsoever.

*Example 3.—Tablets*

The active substance such as 2-(p-aminobenzenesulfonamido)-5-methoxy pyrimidine is mixed into a paste with, for example, corn starch and polyvinylpyrrolidone. This paste is then granulated and dried. After adding white talcum, the mass is then tableted, the final product being approximately 600 mg. containing approximately 500 mg. of the active substance.

This composition is the same as has been commonly employed for many years in conjunction with Andal (a combination of equal parts of sulfa-ethyl thiodiazole, sulfapyrimidine [sulfadiazine], and sulfa-methyl pyrimidine [sulfamerazine]), but the active substance of this invention is used instead.

*Example 4.—Liquid suspension for peroral administration*

A liquid suspension is produced having a concentration equivalent to 500 mg. of active substance per teaspoon. The active substance such as 2-(p-aminobenzenesulfonamido)-5-ethoxy pyrimidine is comminuted to a grain size of approximately 5–10 microns, and is then homogenized in an aqueous solution of sugar and hydroxyethylcellulose. To this mixture is added a suitable surfactant such as, for example, the sodium salt n-lauryl-sulfate. Finally, a taste-pleasing substance, for example, essence of raspberry is added to make the suspension quite palatable. The entire mixture can be homogenized in a colloid mill or any other piece of equipment that is suitable for homogenization.

This composition is the same as has been commonly employed for many years in conjunction with-Protocid (a combination of equal parts of sulfamerazine and sulfaethyl thiodiazole), but the active substance of this invention is used instead.

*Example 5.—Liquid injection*

1 gram of 2-(p-aminobenzenesulfonamido)-5-methoxy pyrimidine is dissolved in pyrogen-free water containing sufficient alkali, e.g., 100% NaOH, to yield a pH of approximately 9.8; and a small quantity, about 2.5 mg. of sodium ethylenediamine tetraacetate, the total solution being about 10 ml. This solution is then filled into ampules and sterilized at a temperature of approximately 120° C.

This composition is the same as has been commonly employed for many years in conjunction with Albucid (a pharmaceutical on the basis of p-aminobenzene-sulfonacetyl amide), but the active substance of this invention is used instead.

The benzene sulfonamido derivatives of this invention are effective towards the same bacteria which are controlled by conventional sulfa drugs, such as, for example, sulfadiazine, as mentioned in Table I, it being standard practice to employ such sulfa drugs in the treatment of mammals. For example, the derivatives of this invention are bacteriostatic or bactericidal towards the following bacteria:

M. pyogenes aureus
Diplococcus pneumoniae
Str. aronson
Streptococcus
Corynebacterium diphtheriae
Corynebacterium xerose
B.-subtilis
B. anthracis
Str. faecalis
Klebsiella pneumoniae
E. coli
S. typhi
S. enteritidis Gärtner
S. paratyphi B
S. typhimurium Breslau
Shigella
Pseudomonas aeruginosa
B. proteus
H. pertussis
Brucella abortus Bang
Aerobacter aerogenes
S. suipstifer
and others.

Consequently the compounds of this invention are especially useful in all infectious diseases which are considered sensitive to sulfonamides, e.g., generalised or local bacterial infections due to streptococci as well as such ones caused by staphylo-, pneumo, meningo, gonococci E. coli besides *Bacillus dysenteriae*. From the foregoing description, one skilled in the art can easily ascertain the essential characteristics of this invention and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A method of prolonging the effective concentration of sulfa drugs in the blood of a human patient, which method comprises the step of administering to said patient a pharmaceutically effective dosage of 2-sulfanilamido-5-alkoxy-pyrimidine wherein the alkoxy group is of 1–2 carbon atoms.

2. A method of prolonging the effective concentration of sulfa drugs in the blood of a human patient, which method comprises the step of administering to said patient a pharmaceutically effective dosage of 2-sulfanilamido-5-methoxy-pyrimidine.

3. A method of prolonging the effective concentration of sulfa drugs in the blood of a human patient, which method comprises the step of administering to said patient a pharmaceutically effective dosage of 2-sulfanilamido-5-ethoxy-pyrimidine.

4. A pharmaceutical composition in unit dosage form comprising about 250 to 1000 mg. of 2-sulfanilamido-5-alkoxy-pyrimidine wherein the alkoxy group is of 1–2 carbon atoms, and a pharmaceutically acceptable carrier, said composition being capable of exhibiting a prolonged effective concentration of said 2-sulfanilamido-5-alkoxy-pyrimidine in the blood of mammals.

5. A pharmaceutical composition in unit dosage form comprising about 250 to 1000 mg. of 2-sulfanilamido-5-methoxy-pyrimidine, and a pharmaceutically acceptable carrier, said composition being capable of exhibiting a prolonged effective concentration of said 2-sulfanilamido-5-methoxy-pyrimidine in the blood of mammals.

6. A pharmaceutical composition in unit dosage form comprising about 250 to 1000 mg. of 2-sulfanilamido-5-ethoxy-pyrimidine, and a pharmaceutically acceptable carrier, said composition being capable of exhibiting a prolonged effective concentration of said 2-sulfanilamido-5-ethoxy-pyrimidine in the blood of mammals.

7. A tablet comprising about 250 to 1000 mg. of 2-sulfanilamido-5-alkoxy-pyrimidine wherein the alkoxy group is of 1–2 carbon atoms, and a pharmaceutically acceptable carrier, said tablet being capable of exhibiting a prolonged effective concentration of said 2-sulfanilamido-5-alkoxy-pyrimidine in the blood of mammals.

8. A tablet comprising about 250 to 1000 mg. of 2-sulfanilamido-5-methoxy-pyrimidine, and a pharmaceutically acceptable carrier, said tablet being capable of effecting a prolonged effective concentration of said 2-sulfanilamido-5-methoxy-pyrimidine in the blood of mammals.

9. A tablet comprising about 250 to 1000 mg. of 2-sulfanilamido-5-ethoxy-pyrimidine, and a pharmaceutically acceptable carrier, said tablet being capable of effecting a prolonged effective concentration of said 2-sulfanilamido-5-ethoxy-pyrimidine in the blood of mammals.

10. A liquid suspension for peroral administration, said liquid suspension comprising about 250 to 1000 mg. per teaspoon of 2-sulfanilamido-5-alkoxy-pyrimidine wherein the alkoxy group is of 1–2 carbon atoms, and a pharmaceutically acceptable carrier, said liquid suspension being capable of effectingg a prolonged effective concentration of said 2-sulfanilamido-5-alkoxy-pyrimidine in the blood of mammals.

11. A liquid suspension for peroral administration, said liquid suspension comprising about 250 to 1000 mg. per teaspoon of 2-sulfanilamido-5-methoxy-pyrimidine, and a pharmaceutically acceptable carrier, said liquid suspension being capable of effecting a prolonged effective concentration of said 2-sulfanilamido-5-methoxy-pyrimidine in the blood of mammals.

12. A liquid suspension for peroral administration, said liquid suspension comprising about 250 to 1000 mg. per teaspoon of 2-sulfanilamido-5-ethoxy-pyrimidine, and a pharmaceutically acceptable carrier, said liquid suspension being capable of effecting a prolonged effective concentration of said 2-sulfanilamido-5-ethoxy-pyrimidine in the blood of mammals.

13. An injection solution comprising about 1 gram of 2-sulfanilamido-5-methoxy-pyrimidine in 10 ml. of a sterilized solution of pyrogen-free water at a pH of about 9.4 and containing a small quantity of sodium ethylenediamine tetraacetate.

14. A method of prolonging the effective concentration of sulfa drugs in a mammal, which method comprises the step of administering to said mammal a pharmaceutically effective dosage of 2-sulfanilamido-5-alkoxy-pyrimidine wherein the alkoxy group is of 1–2 carbon atoms.

15. A method of prolonging the effective concentration of sulfa drugs in the blood of a mammal, which method comprises the step of administering to said mammal a pharmaceutically effective dosage of 2-sulfanilamido-5-methoxy-pyrimidine.

16. A method of prolonging the effective concentration of sulfa drugs in the blood of a mammal, which method comprises the step of administering to said mammal a pharmaceutically effective dosage of 2-sulfanilamido-5-ethoxy-pyrimidine.

References Cited by the Examiner

UNITED STATES PATENTS

| | | | |
|---|---|---|---|
| 2,407,966 | 9/46 | Sprague | 260—239.7 |
| 2,430,439 | 11/47 | Winnek et al. | 260—239.75 |
| 2,494,524 | 1/50 | Sprague | 260—239.75 |
| 2,947,743 | 8/60 | Hoffer | 167—51.5 |

FOREIGN PATENTS

| | | |
|---|---|---|
| 555,865 | 9/43 | Great Britain. |
| 575,005 | 1/46 | Great Britain. |

OTHER REFERENCES

Braker et al., Journal American Chemical Society, vol. 69, 1947, pages 3072–3078.

Jenkins, "The Art of Compounding," McGraw-Hill, 1957, New York, pages 196 and 276.

JULIAN S. LEVITT, *Primary Examiner*.

FRANK CACCIAPAGLIA, JR., *Examiner*.